United States Patent

[11] 3,610,393

[72] Inventors Ronald E. Richardson
Oshawa, Ontario;
Gordon F. Pereman, Columbus; John D. Kellar, Oshawa, Ontario; Jan G. Borremans, Oshawa, Ontario, all of Canada
[21] Appl. No. 10,428
[22] Filed Feb. 11, 1970
[23] Division of Ser. No. 742,334, July 3, 1968, Pat. No. 3,530,970
[45] Patented Oct. 5, 1971
[73] Assignee PPG Industries, Inc. Pittsburgh, Pa.

[54] LIFTER FOR USE WITH AUTOMATIC TONG UNLOADER
4 Claims, 15 Drawing Figs.
[52] U.S. Cl. ................................................. 198/20, 214/152
[51] Int. Cl. ..................................................... B65g 47/00
[50] Field of Search ........................................... 198/20, 177, 179, 134; 214/44, 152; 65/273, 288; 104/97; 294/118, 119

[56] References Cited
UNITED STATES PATENTS
| | | | |
|---|---|---|---|
| 2,645,186 | 7/1953 | Davis | 198/20 |
| 2,826,292 | 3/1958 | Arnold | 198/20 |
| 3,084,969 | 4/1963 | Davidson | 294/118 |

Primary Examiner—Richard E. Aegerter
Attorney—Cushman, Darby & Cushman

ABSTRACT: The disclosure shows apparatus and method for transferring a tong suspended glass sheet from a first conveyor system to a peg conveyor in a relatively gentle manner by engaging the tong suspended glass sheet at its bottom edge and then lifting the glass upwardly to relax the tongs. The relaxed tongs are then engaged and held in the relaxed position while the bottom edge supporting member lowers the glass toward the peg conveyor.

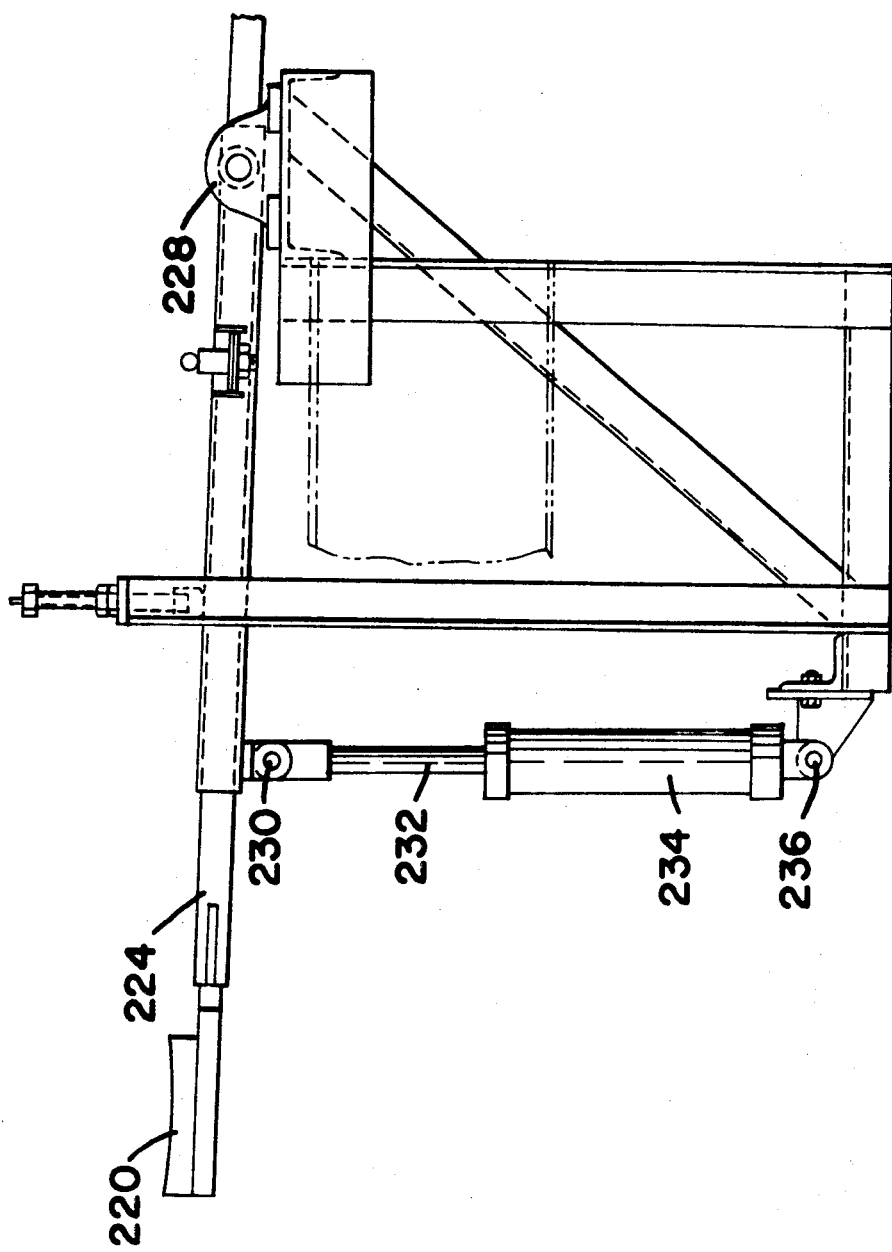

LIFTER FOR USE WITH AUTOMATIC TONG UNLOADER

This is a divisional of our copending application Ser. No. 742,334 filed July 3, 1968, now Pat. No. 3,530,970.

This invention relates to the automatic handling of rigid sheet materials, and while it has particular utility in the transferring of glass sheets from one conveyor system to another, it is to be understood that the invention also has utility in automatically handling sheets of any rigid material.

U.S. Pat. No. 3,084,969, issued Apr. 9, 1963 to Charles R. Davidson, Jr. and William P. Mitchell, discloses and claims apparatus for transferring glass sheets automatically from a first conveyor system wherein the glass sheets are suspended in a vertical plane by means of tongs which engage the glass sheets adjacent their uppermost edges, to a further conveyor system, popularly termed a "peg" conveyor where each sheet so transferred is supported along its lower edge and balanced by the pegs of such conveyor for further cooling.

In the above referred to Davidson and Mitchell patent, the transfer of glass from the upper conveyor system to the peg conveyor takes place at a transfer station wherein the glass sheets are individually poised above the peg conveyor in a position such that they may be dropped downwardly onto the latter. In order to effect release of the tongs engaging the upper edge portions of the glass, each of said tongs, which were of the jointed type typically used to grip glass sheets between gripper members carried at the lower ends of a pivotally interconnected link system, were provided with a pair of horizontally extending arms extending outwardly from the lower ends of the tong links. The apparatus was provided with a pair of lifting arms adapted to contact the aforementioned tong arms thereby to cause the engaging elements of the tongs to separate from each other and release the glass whereby the latter dropped downwardly onto the pads of the peg conveyor. The apparatus was provided with an elaborate control system whereby all of the above-mentioned operations took place automatically, with the peg conveyor being shifted one increment for each sheet of glass deposited thereon.

The unloading device described above has been very successful in commercial operations because it permitted eliminating laborers who previously transferred the glass sheets by hand from one conveyor system to the other. However, the above referred to invention possessed a number of disadvantages which will now be discussed. Firstly, it is apparent that when the arms of the tongs were engaged by the tong engaging elements referred to previously, the glass would be released and would be dropped downwardly a certain distance onto the peg conveyor. Although the distance which the glass was required to be dropped was made as small as possible, a certain amount of wear of the glass engaging elements of the tongs and the peg conveyor pads occurred. This wear was apparently caused by the relative motion between the glass sheet, on the one hand, and the tong elements engaging the sheet and pads receiving the sheet, on the other hand, which occurred at the time of release of the glass sheet from such tongs. In addition, a certain amount of distortion of the glass sheets in the vicinity of the points of engagement of the glass by the tongs was noticed.

In accordance with the present invention it has been found that the above referred to disadvantages of the Davidson and Mitchell device may be substantially overcome by providing the sheet transfer device with a lifting arrangement which engages the tong suspended glass sheet at its lower edge thereby to lift the glass sufficiently to relax the tongs. The tongs so relaxed are then engaged by the tong engaging elements thereby to retain the tongs in the relaxed, nonglass gripping state. With the tongs held in this relaxed condition, the glass lifting element descends downwardly towards the peg conveyor along with the glass sheet thereby effecting a gentle yet rapid transfer of the glass sheet from the upper conveyor to the peg conveyor. By handling the glass sheet in the above described manner, less distortion of the glass sheets adjacent the points of tong engagement was found, and a substantial increase in tong life and pad life was realized.

The present divisional relates to the method aspect of the invention and accordingly provides a method of transferring a rigid sheet of material suspended from tongs which engage an upper edge portion of the sheet to a further support means. The method includes the step of applying a lifting force to a lower edge portion of the sheet to lift the latter and effect a relaxation of said tongs and, hence, disengagement thereof from the sheet. The tongs are thereafter engaged in such manner as to maintain the same in the relaxed condition with the sheet being thereafter lowered downwardly onto said further support while maintaining the tongs in said relaxed condition thereby effecting a transfer of the sheet from tong suspension to said further support.

The apparatus for carrying out the method of the present invention is claimed in the above-mentioned copending application Ser. No. 742,334. The apparatus includes tong means supported by said first support system adapted to engage the sheet adjacent its upper edge, whereby the sheet is suspended from the tong means. The tong means are adapted to assume a relaxed, nonengaging position upon upward movement of the suspended sheet relative to the first support system. Means are provided to lift the sheet upwardly to effect relaxation of said tong means and means are operatively associated with said tongs and adapted to maintain same in the relaxed condition upon completion of the upward lifting of the sheet. The apparatus also includes means operable to effect lowering of said sheet onto said second support system while said tong means are maintained in the relaxed condition.

In the preferred embodiment of the invention, the apparatus is adapted to handle sheets of glass; the first support system comprises an upper conveyor system while the second support system comprises a further conveyor disposed below the upper conveyor system.

In carrying out the method of the present invention, a lifter element is used which engages bottom edge portions of the glass sheet when the latter has been moved by the upper conveyor system to a position whereat it may be lowered downwardly directly onto the lower conveyor system. The glass lifter element is automatically actuated each time the upper conveyor system shifts a sheet of material into a position for transfer to the lower conveyor. The tong engaging elements previously referred to which are adapted to engage the tongs and maintain same in a relaxed condition are actuated automatically upon completion of the upward motion of the sheet effected by the lifter element. As a matter of fact all of the operations of the device are effected in a completely automatic manner and manual operation of the system and/or handling of the glass sheets during the transfer operation is completely obviated.

A particular embodiment of the present invention will now be described. It is to be understood that this description is for illustrative purposes only and that mechanical equivalents of the various elements may be substituted without departing from the spirit of the invention.

In the drawings which form part of the description and wherein like reference numerals refer to like structural elements;

FIG. 14 is an elevation view of the center lifting device forming part of the modified device of FIGS. 12 and 13.

Figure 1:
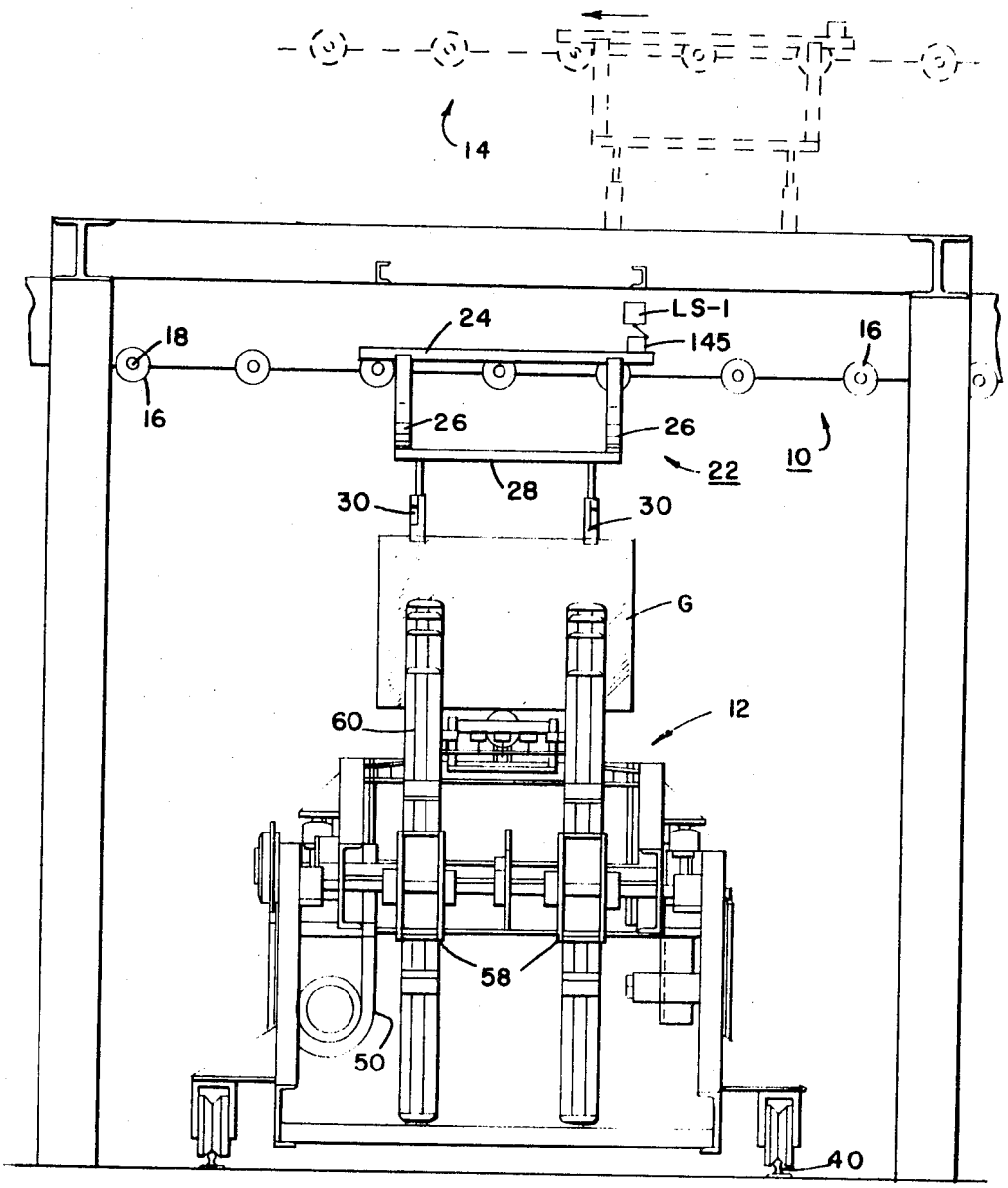
FIG. 1 is a fragmentary side elevational view of a sheet transfer station employing the principles of the present invention.
Figure 2A:
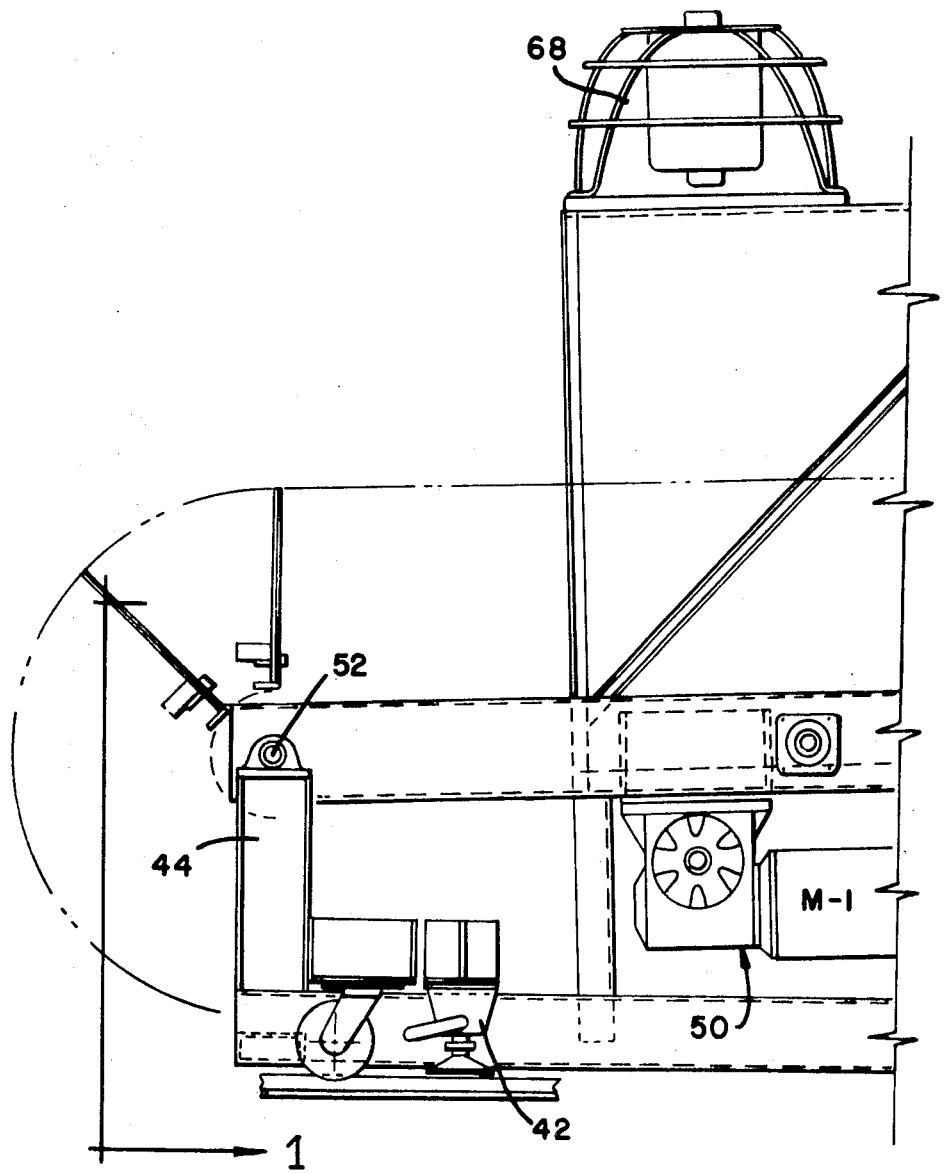
FIGS. 2A and 2B are first and second halves of a fragmentary end view of the transfer station shown in FIG. 1.
Figure 2B:
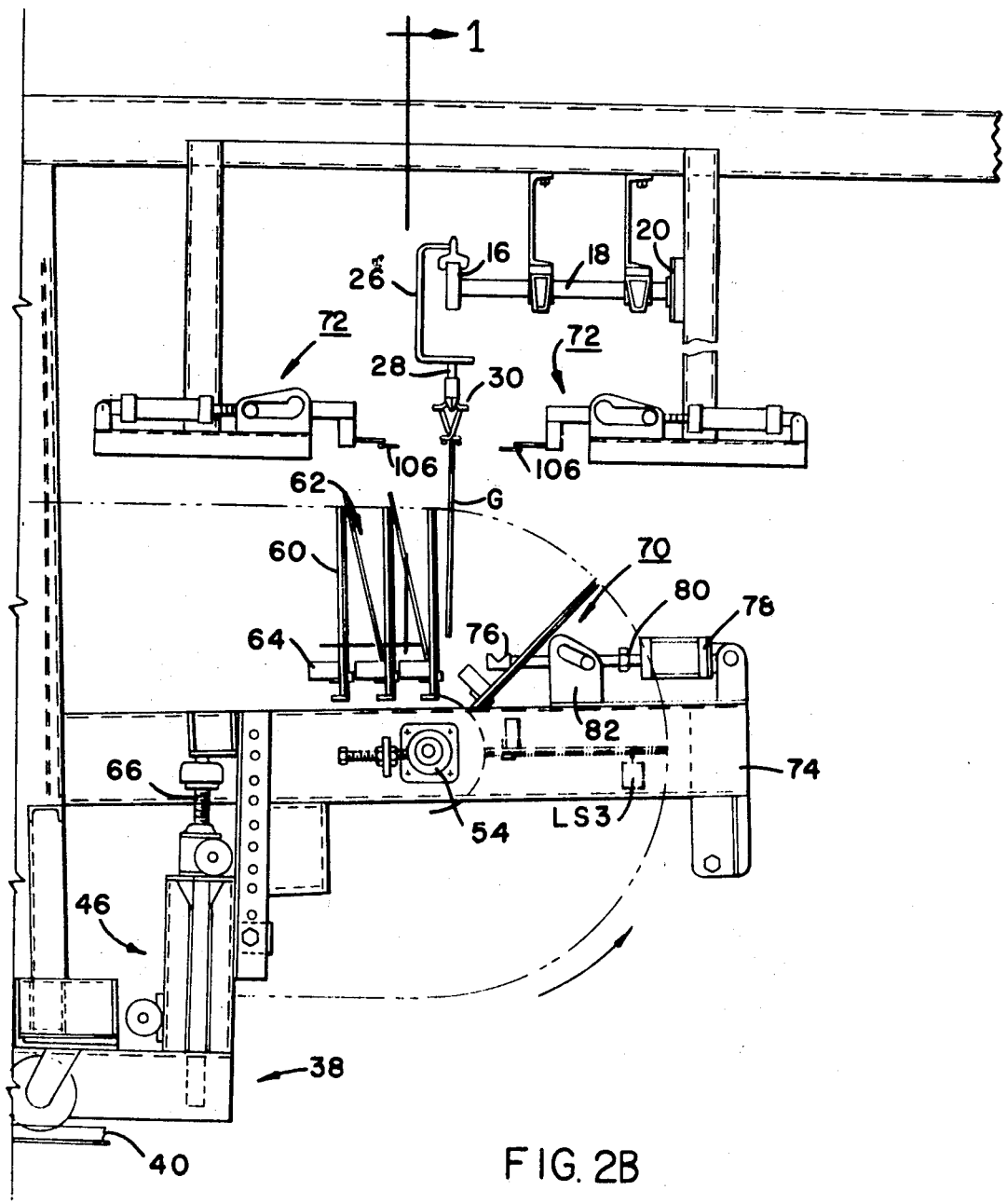

Referring to FIGS. 1 and 2 of the drawings there are shown two mutually perpendicular views of a glass transfer station located generally in a vertical plane with the path of travel defined by an upper conveyor 10 lying generally in such vertical plane. Upper conveyor 10 is arranged to transport glass supporting carriages to the transfer station. A lower conveyor 12 extends outwardly and downwardly from the transfer station in a vertical plane generally at right angles to said first mentioned vertical plane. Lower conveyor 12 transports glass sheets released from said carriages to an unloading station. FIG. 1 also shows in phantom a return conveyor 14 arranged to return empty carriages to a reloading station (not shown).

The upper conveyor 10 includes a plurality of aligned stub rollers 16 each mounted on a shaft 18 for rotation in bearings 20. The shafts 18 are fixed to sprockets (not shown) driven by a conveyor motor (not shown) through a conventional drive chain (not shown).

The upper conveyor 10 transports a series of carriages 22 into and out of the transfer station. Each carriage 22 comprises an upper rail 24 which rests upon the stub rolls 16, a pair of curved, spaced, connecting portions 26 which extend downwardly to a lower portion 28. The curved connecting portions 26 interconnect the upper rail 24 to the lower portion 28.

A pair of tongs 30 are suspended from the lower portion 28. The tongs are of the type illustrated in the aforementioned patent of Davidson and Mitchell and include, with particular reference to FIG. 4, a pair of tong arms 34 pivotally interconnected together by pivot pin 33. Each of the tong arms 34 are provided adjacent the bottom ends with opposed tong points 35 adapted to engage the upper edge of a glass sheet. Also connected adjacent pivot pin 33 is a stop member 32 which limits the distance that the glass sheet may enter between tong points 35. Pivotally connected to the upper ends of tong arms 34 are pivot links 37, the latter in turn being pivotally connected to a pivot pin 29. Pivot pin 29 is secured within bracket 28, the latter serving to firmly secure tongs 30 to the previously referred to connecting portions 26. Additional arms 36 extend horizontally outwardly of the upper extremities of the tong arm 34 to facilitate unloading of the glass sheet as will be explained in great detail later.

By virtue of the stop member 32, an upward thrust on the glass sheet G which raises the latter will cause links 37 together with tong arms 34 to be shifted upwardly thus causing tong points 35 to be moved outwardly away from each other causing the same to release their hold upon the glass sheet. This feature of tongs 30 is used to full advantage in the present invention as will be seen more clearly hereinafter.

The lower conveyor 12, popularly termed a "peg" conveyor, extends transversely and obliquely downwardly from the transfer station towards a packaging station (not shown) and is supported on a car 38 mounted on tracks 40. A brake 42 on car 38 fixes the position of the car along the tracks 40 so that the peg conveyor 12 is properly aligned with the upper conveyor 10 at the transfer station. The car 38 is provided with a relatively low standard 44 to support the end of the conveyor 12 most closely adjacent the packaging station, and an adjustable support 46 to support the opposite end of the conveyor 12.

The peg conveyor 12 is intermittently driven in rotation by means of gear motor arrangement 50 including motor M1 which acts through suitable clutch and brake means (not shown) to drive conveyor shafts 52 and 54. Further details of the peg conveyor drive arrangement are not shown here but a full description thereof may be had from the aforementioned Canadian patent to Davidson and Mitchell.

Figure 3:
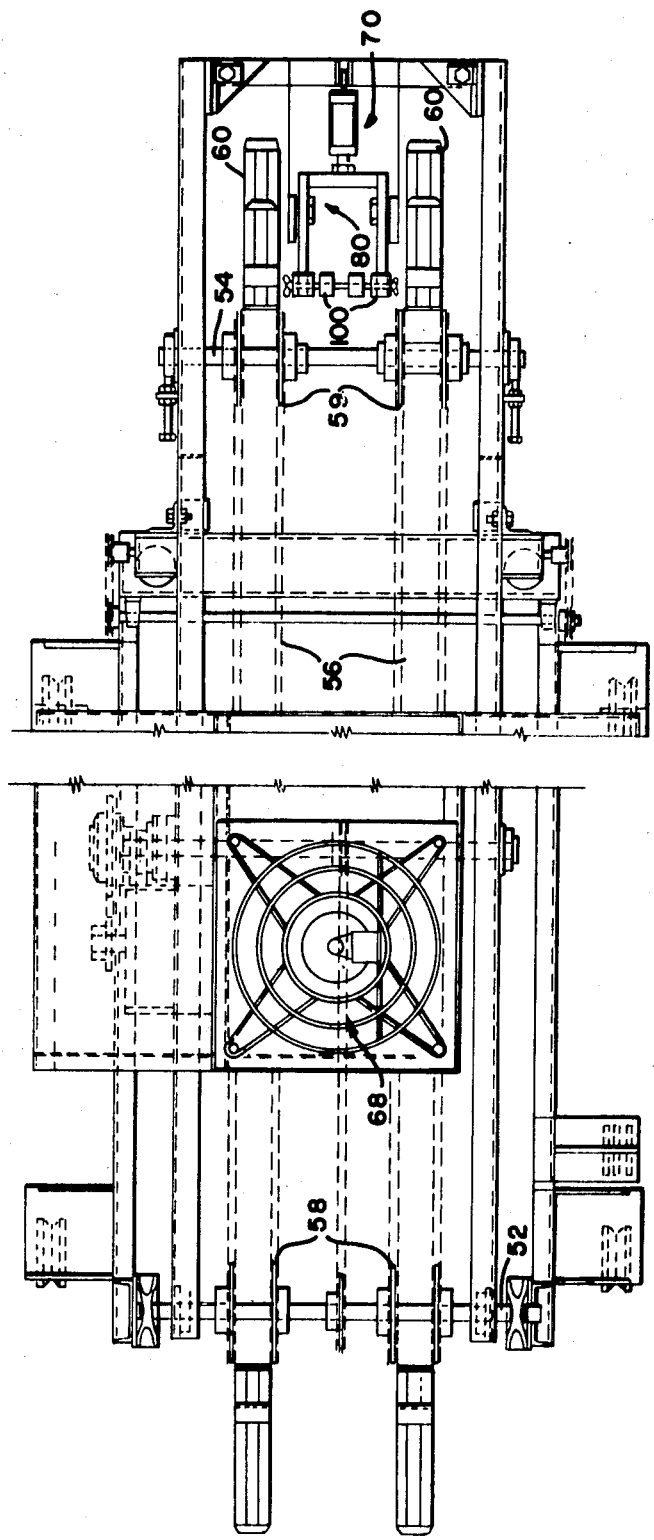
FIG. 3 is a plan view of the sheet transfer station shown in FIGS. 2A and 2B.

The peg conveyor 12 as best seen in FIGS. 2 and 3 includes a spaced pair of link chains 56 trained about spaced pairs of toothed sprockets 58 and 59 located on driven shafts 52 and 54, respectively. Suitably connected to chains 56 at spaced intervals therealong are pegs 60. The pegs 60 are so mounted on the conveyor chains 56 that they extend in substantially vertical planes along the upper run of peg conveyor 12. The pegs 60 are arranged in sets of two pegs, with each set being aligned parallel to the shafts 52 and 54. Each set of pegs 60 is spaced sufficiently from its adjacent set to form spaces 62 sufficiently wide as to permit a glass sheet G released from tongs 30 to enter between adjacent sets of pegs. Secured to the innermost end of each of the pegs 60 is a support pad 64. The pad 64 associated with each peg set substantially spans the gaps existing between adjacent sets of pegs and serves to provide support for the bottom edge of a glass sheet G deposited on the peg conveyor 12.

The adjustable support 46 includes a screwjack 66 to permit adjustment of the height of the end of the peg conveyor at its glass receiving end thereby to accommodate for different sizes of glass sheets which may be handled from time to time by the apparatus.

Positioned above the peg conveyor 12 in spaced relation therealong are a plurality of cooling fans 68. The cooling fans 68 are arranged to direct cooling air onto the surfaces of the glass sheets as they are carried along the peg conveyor thereby making it possible for personnel at the end of the peg conveyor 12 to remove glass sheets therefrom and package them.

GLASS LIFTER AND TONG ENGAGING AND HOLDING ASSEMBLIES

The glass lifter and tong engaging and holding assemblies are best seen in FIGS. 2 through 7. The glass lifter assembly is generally designated as 70 while the tongs engaging and holding assembly is generally designated as 72.

The glass lifter assembly 70 will first of all be described. Referring to FIGS. 2, 3, 6 and 7 it will be seen that the glass lifter assembly 70 is disposed on an outwardly extending portion 74 of the peg conveyor 12. The lifter assembly generally includes a glass engaging portion designated 76, an actuating cylinder 78 and an intermediate portion connecting the actuating cylinder 78 and the glass engaging portion 76 designated as 80. The glass lifter also includes a cam assembly 82 constructed and arranged to provide horizontal and vertical components of motion of the glass engaging portion 76 during the glass raising and lowering operations.

Figure 6:
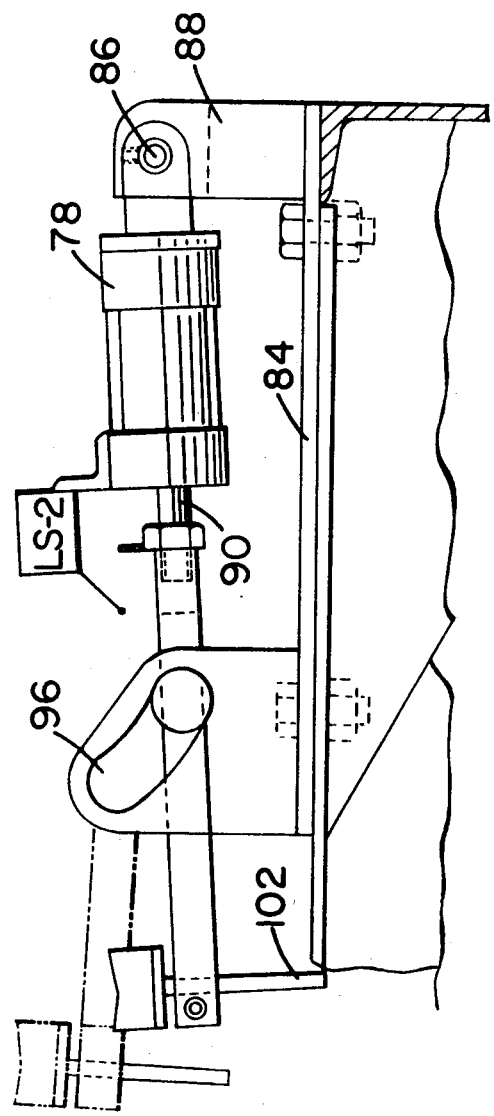
FIGS. 6 and 7 are end elevation and plan views respectively of the glass bottom edge engaging and lifting assembly.
Figure 7:
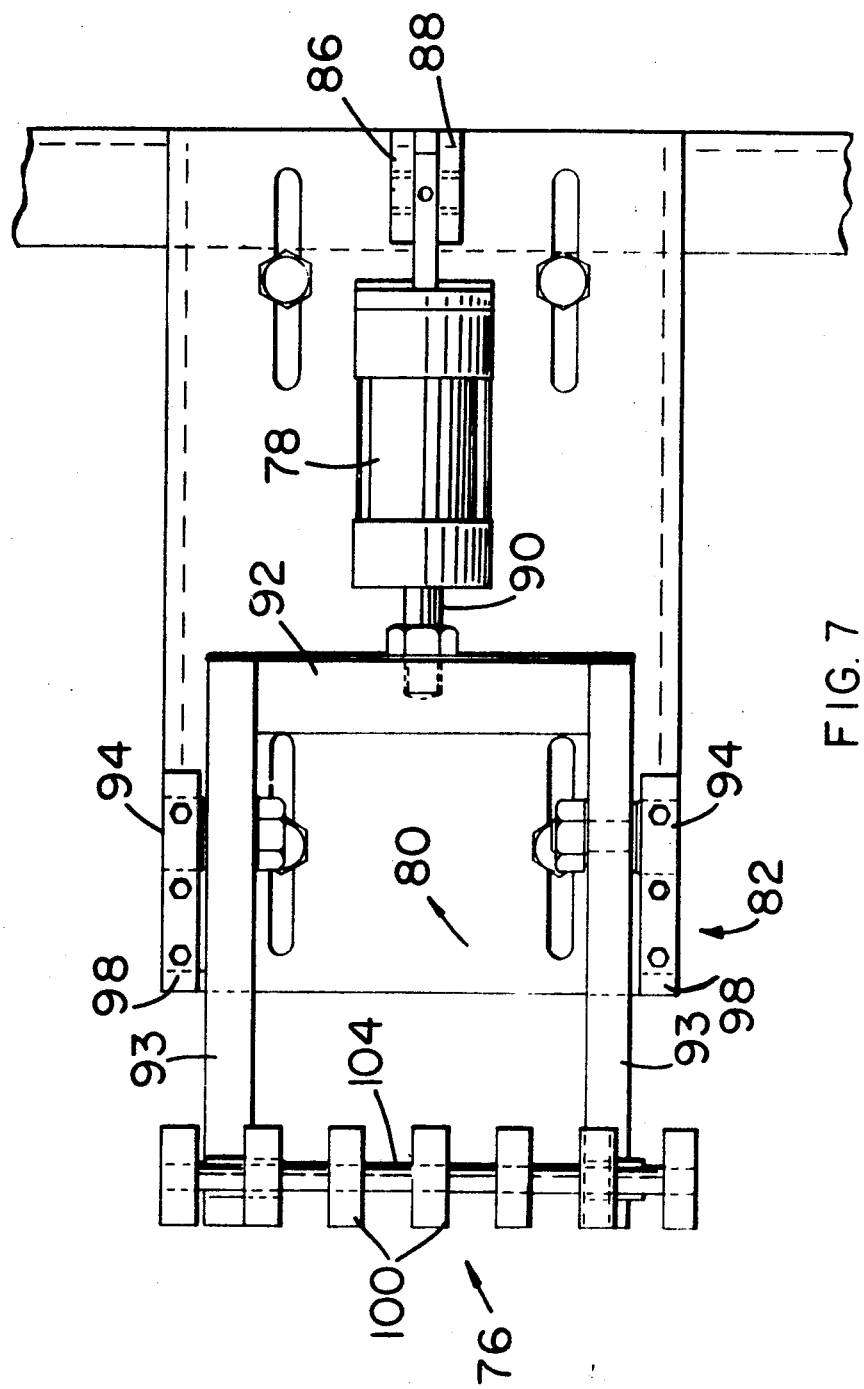

Referring to FIGS. 6 and 7, it will be seen that glass lifter assembly 70 is mounted on a baseplate 84, the latter in turn being secured firmly to the outwardly extending portion 74 of the peg conveyor 12. A pneumatically actuated cylinder 78 is pivotally mounted at 86 on support trunnions 88. The ram 90 of the cylinder 78 is connected to the intermediate portion 80 which comprises a yoke member 92 including arm portions 93, the latter each having an outwardly projecting cam follower 94 associated therewith. Cam followers 94, which comprise a portion of the cam assembly 82 previously referred to, are in engagement with curved elongated slots 96 formed in spaced cam plates 98 located on opposing sides of yoke 92. The slots 96 are shaped so as to give their associated cam followers 94 substantially equal amounts of horizontal and vertical movement as such cam followers 94 move from one end to the other of each of the cam slots 96. Mounted on the free ends of the yoke arms 93 are a plurality of spaced pads 100 which serve to engage and support the bottom edge of a sheet of glass G as seen in FIG. 2. Each support pad 100 is suitably attached to a stem portion 102 with each of the latter in turn being suitably secured to a crossmember 104 which is connected at its opposing ends to the yoke arms 93. The stem portions 102 may be mounted in the crossmember 104 by suitable setscrews thereby permitting vertical adjustment of support pads 100 so as to accommodate for various shapes and sizes of glass sheets G. The support pads 100 are provided with a glass engaging portion of a material which is not affected to any great degree by the temperature of the glass and which also does not tend to chip or mar the portion of the glass sheet contacted by the support. The above-mentioned glass engaging portion may be made from wood or alternatively from an asbestos material. The supports 100 are provided with shallow V-shaped notches on their upper surfaces thereby to eliminate slippage of the bottom edge of the glass sheet with respect to the support pads during the raising and lowering operations to be described hereinafter.

The relative positioning of the lifter assembly 70 relative to the various components of the peg conveyor may be readily seen in FIGS. 2 and 3. The lifter assembly 70 is so arranged that the support pads 100 extend intermediate the spaced sets of pegs 60 with the support pads 100, in the lowermost and retracted position of the lifter assembly being positioned slightly below and substantially in line with a spaced pair of support pads 64 of the peg conveyor 12 thereby to permit a glass sheet to be deposited on the latter upon completion of downward and rearward movement of the lifter assembly.

Figure 4:
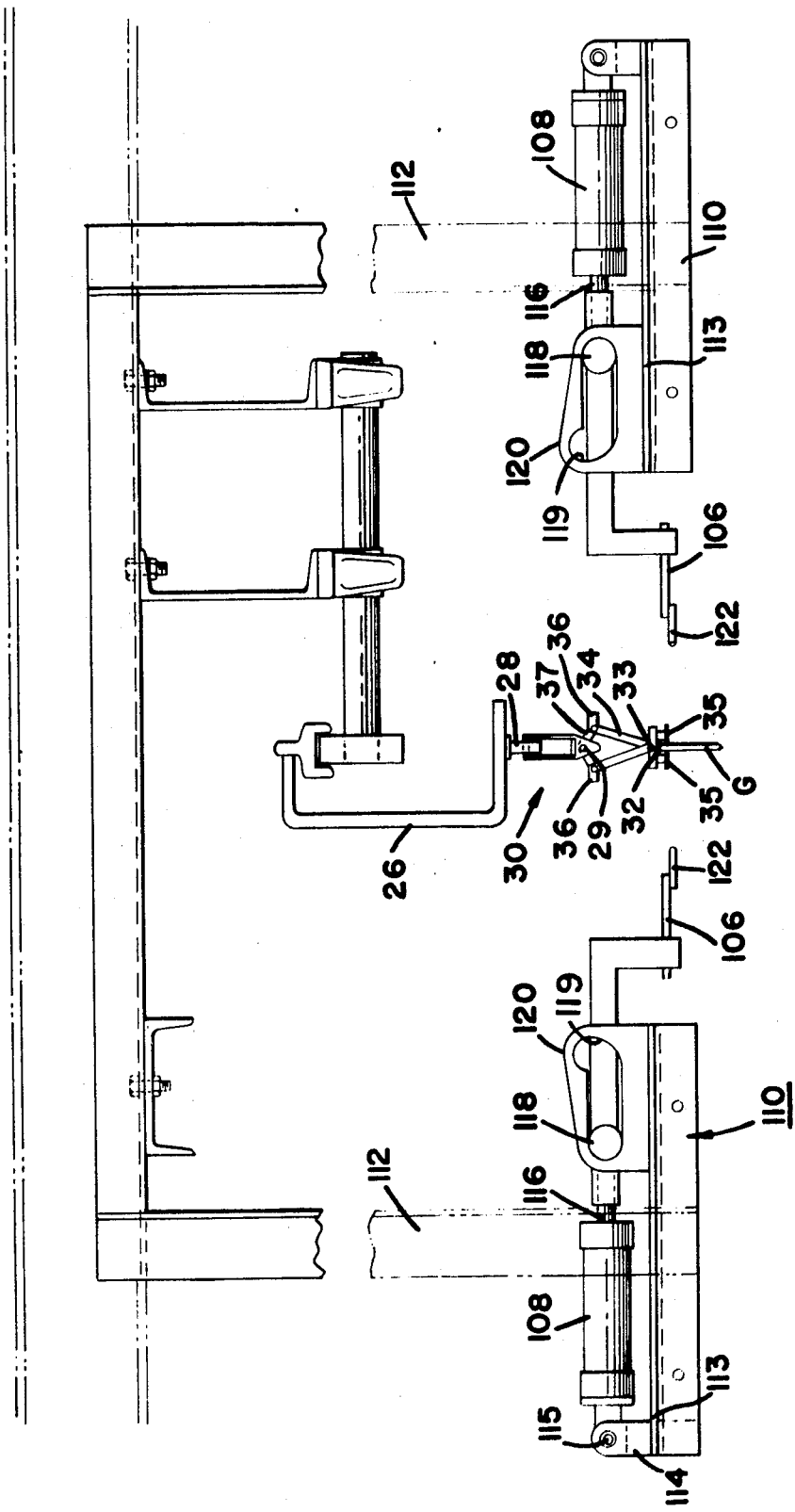
FIG. 4 is a fragmentary end elevation view of the elements for engaging the tongs and holding same in relaxed condition.
Figure 5:
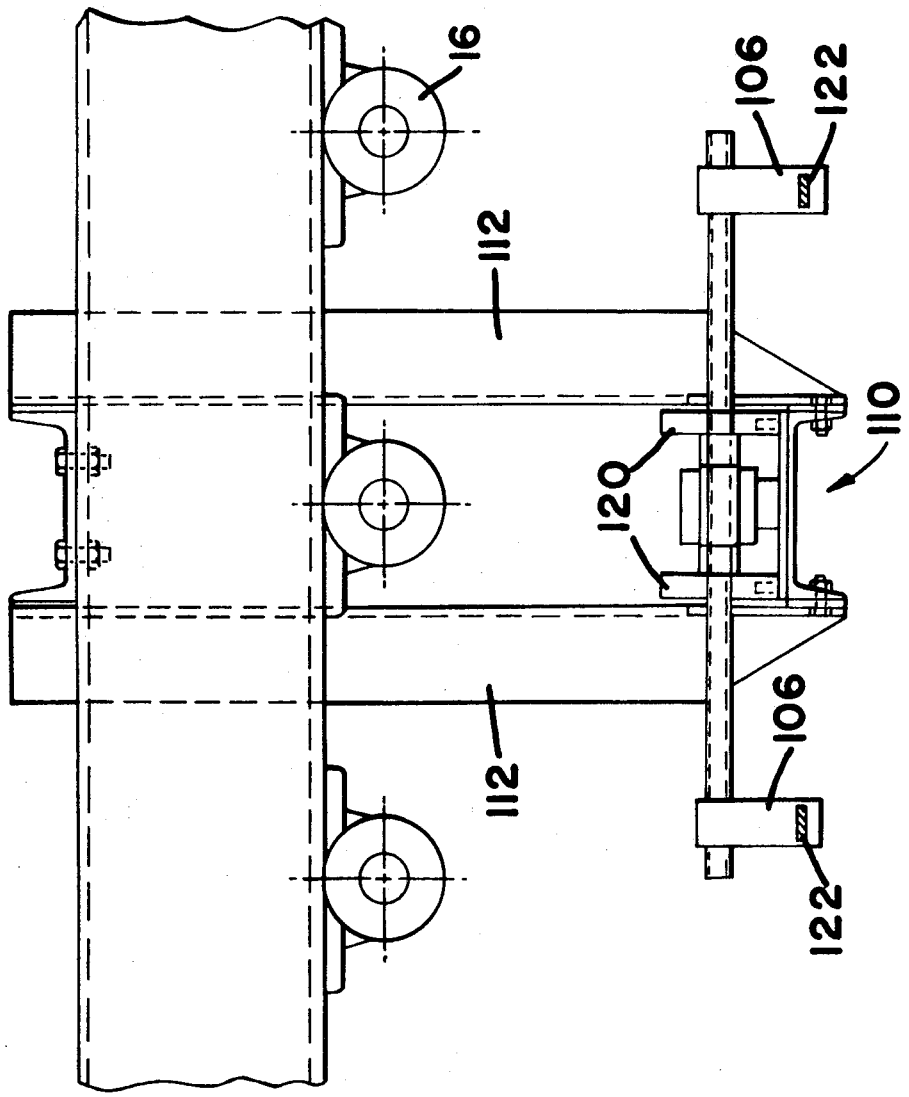
FIG. 5 is a fragmentary side elevation view of the apparatus of FIG. 4 taken along line 5—5 and looking in the direction of the arrows.

With reference to FIGS. 2 and 4 it will be seen that the tong engaging and holding assembly 72 includes a spaced pair of lifting arms 106 which are adapted to be actuated in unison by solenoids 108 thereby to move arms 106 towards one another while moving vertically thereby to engage the outwardly extending tong arms 36 as previously described.

The tong engaging and holding elements 72 generally include a pair of spaced subassemblies 110 rigidly held in a fixed position by means of downwardly depending frame members 112. Each subassembly 110 generally includes a baseplate 113. Mounted adjacent the ends of each baseplate 113 are trunnions 114 to which are pivotally attached as at 115 the actuating cylinders 108. The ram 116 of each cylinder 108 is securely attached to a lifter arm 106. Each lifter arm 106 includes a pair of laterally projecting cam followers 118 which engage with the cam slots 119 formed in spaced pairs of cam plates 120. Cam slots 119 each have the shape clearly shown in FIG. 4 and it will be readily seen that the shape of the cam slots is such that they provide for movement of the lifter arms 106 in a horizontal plane during their initial movement towards one another and a substantial degree of movement in the vertical direction as they closely approach one another thereby to bring the tip portions 122 of each of the lifter arms 106 into lifting engagement with the outwardly extending arms 36 of the tongs 30.

Those skilled in the art will realize that an opposed pair of lifter arms 106 must be provided for each tong 30 provided to support a single sheet of glass G. In most cases, two tongs 30 are required to support each sheet of glass G; this requires that two pairs of tip portions 122 be provided, all positioned in the same horizontal plane.

CONTROL SYSTEM AND MANNER OF OPERATION OF DEVICE

Figure 8:
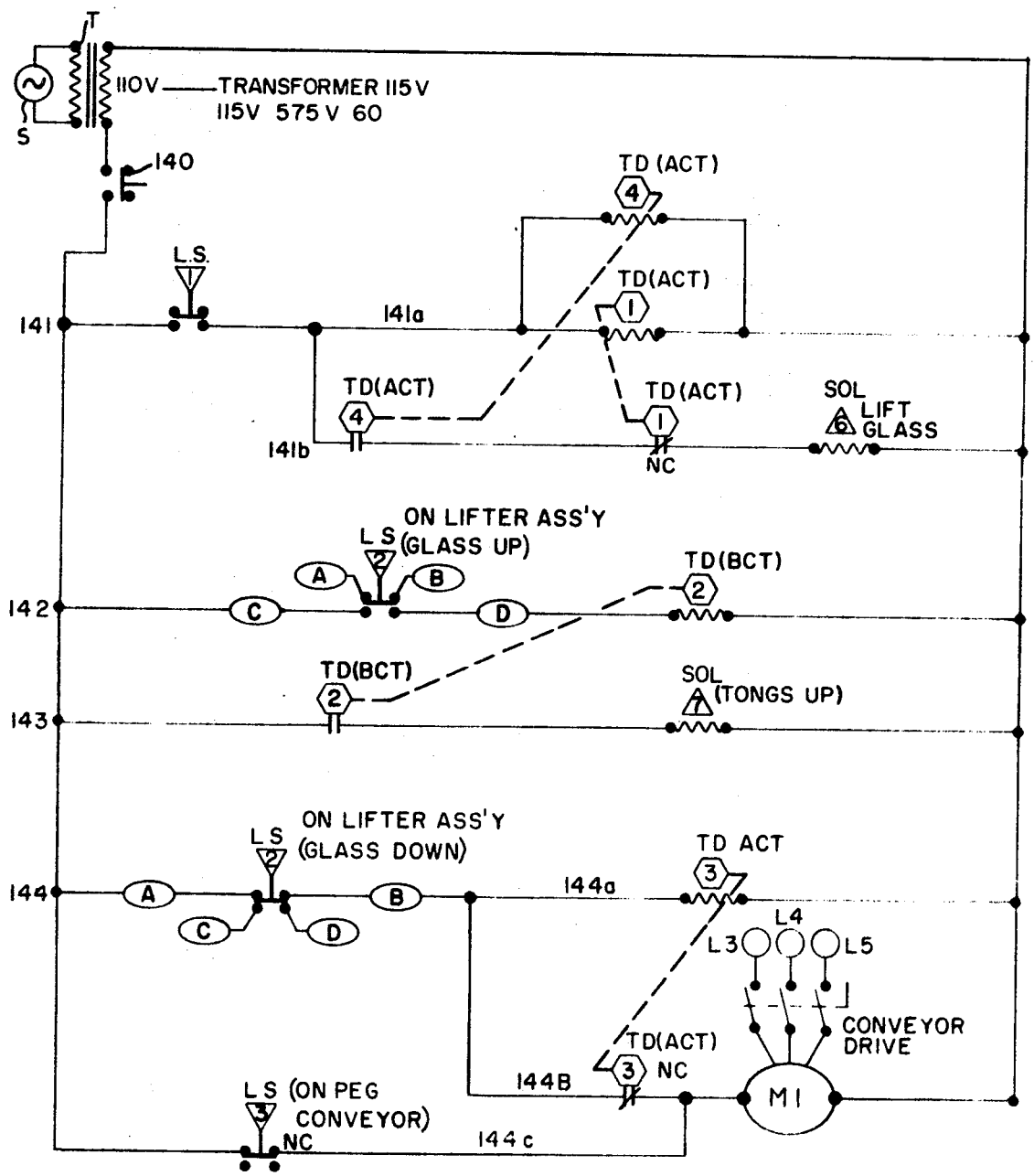
FIG. 8 is a schematic diagram of the control circuitry utilized in the present invention.

The control circuitry for the device of the present invention is shown in schematic fashion in FIG. 8. Before proceeding with a detailed discussion of the control circuitry it is desirable to review the various limit switches involved and the manner in which they are positioned on the apparatus.

The first limit switch LS-1 is located along the carriage conveyor 10 in a position to be actuated by a carriage 22 when the latter is at the transfer station in a position suitable for transfer of a glass sheet G suspended therefrom to the peg conveyor 12. Switch LS-1 is of the normally open variety and, as we shall see hereafter, effects actuation of lifter assembly 70 when the glass sheet G is in a position for automatic removal from the carriage 22.

The limit switch LS-2 is located in a position to be actuated by the movement of the glass lifter assembly 70 and is shown in FIG. 6. The switch LS-2 has a normally open side which controls a circuit to effect actuation of the tong engaging and holding assembly 72, and a normally closed side which serves to control a circuit which effects stepwise movement of the peg conveyor 12.

The limit switch LS-3 is located on the peg conveyor 12 and as can readily be seen from FIG. 2 is located such that it is contacted by and hence actuated by the conveyor pegs 60. The function of limit switch LS-3 is to stop the drive of peg conveyor 12 when the latter is so positioned as to receive a sheet of glass G on the support pads 64.

The control circuit of FIG. 8 includes a suitable power source S which provides power to a transformer T, the latter providing power at approximately 110 volts, 60 cycles AC. The entire control circuit may be provided with a master control switch 140. The control circuit includes a first circuit 141 having therein a serially disposed normally open limit switch LS-1 which controls flow of current through two circuit branches 141a and 141b. Circuit branch 141a has therein parallel connected time delay relays TD1 and TD4. Circuit branch 141b has therein in series a normally open contact TD4 and a normally closed contact TD1 together with a solenoid 6. The solenoid 6 effects actuation of a suitable pneumatic valve (not shown) to selectively actuate cylinder 78 to effect raising or lowering of the glass lifter assembly 70.

Circuit 142 contains the normally open side of limit switch LS-2 the latter being in series with a time delay relay TD2. Circuit 143 includes normally open contact TD2 actuated by time delay relay TD2 and a solenoid No. 7. Solenoid No. 7 provides, by a suitable pneumatic valve, for actuation of the cylinders 108 which effect actuation of the lifter arms 106 as previously described.

Circuit 144 contains the normally closed side of switch LS-2 together with circuit portions 144a and 144b and former including time delay relay TD3, which effects actuation of a normally closed contact for relay TD3 in circuit portion 144b. The contact for relay TD3 serves to provide energy to the starting circuit of conveyor drive motor M1 for the peg conveyor 12. A circuit 144C includes normally closed switch LS-3 which permits the starting circuit of motor M1 to remain energized even when the contacts for relay TD3 are held open by virtue of the action of the time delay relay TD3.

The function of the various timers referred to above will be more fully understood from a reading of the description of the operation of the device. It suffices to state here that timer TD1 controls the length of time that the lifter assembly solenoid No. 6 is energized while timer TD2 controls the length of time the tong holding and engaging solenoid No. 7 is energized, after the glass lift assembly has been retracted. The timer TD3 controls the length of time that power is applied to the peg conveyor starting circuit while TD4 controls the length of time provided to permit pendulum motion of the glass to reduce when the glass has been transported to the transfer station and before the glass lift assembly is actuated.

A full description of the operation of the system will now be given. It will be assumed that a carriage 22 has just been propelled along by conveyor 10 to a position whereat cam 145 on carriage 22 contacts switch LS-1 thereby closing the same and energizing TD1 and TD4. Time delay relay TD4 is set to time "IN" after the pendulumlike motion of the glass sheet G suspended from carriage 22 has reduced to a desired degree; this usually is in the order of 6 seconds. Now when relay TD4 times "IN" normally open contacts TD4 are energized thus feeding current through normally closed contacts TD1 to energize solenoid No. 6. This energization of solenoid No. 6 actuates a pneumatic valve (not shown) with the latter in turn feeding pressurized air to cylinder 78 thus causing its ram 90 to be extended outwardly whereby the glass lifting pads 100 move upwardly to the position shown in FIG. 9. During the upward movement of the pads 100, the latter engage the bottom edge of the glass sheet thus lifting the sheet upwardly until its upper edge contacts stop members 32 of tongs 30. This causes tong members 34 to spread apart thus relaxing the tongs and releasing the engaging elements 35 from the glass.

Figure 10:
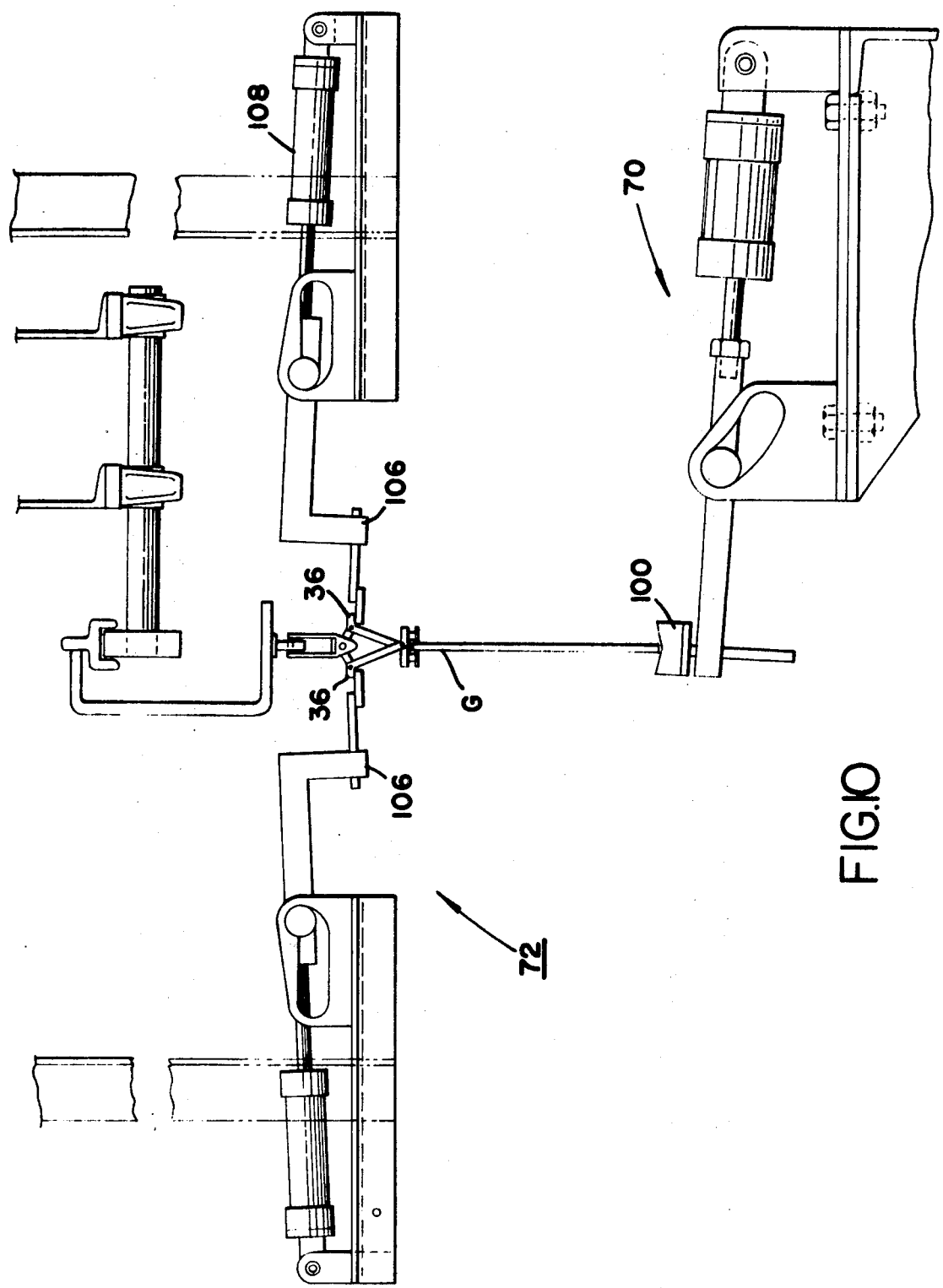

As soon as the glass lifter assembly 70 reaches its uppermost position, switch LS-2 associated therewith is contacted and its normally closed side "OPENS" letting time delay relay TD3 reload. At the same time the normally open side of switch LS-2 "closes" thus "loading" time delay relay TD2. Timer TD2 immediately activates solenoid No. 7 by closing the associated contacts TD2. As soon as solenoid No. 7 is activated, a pneumatic valve associated therewith is actuated thus feeding air under pressure to cylinders 108 thus advancing and raising the tong lifting arms 106 which come into contact with the tong arms 36 (the latter having been previously raised by virtue of the upward motion of the glass sheet G effected by the glass bottom edge lifting assembly). This action is illustrated in FIG. 10.

Figure 11:
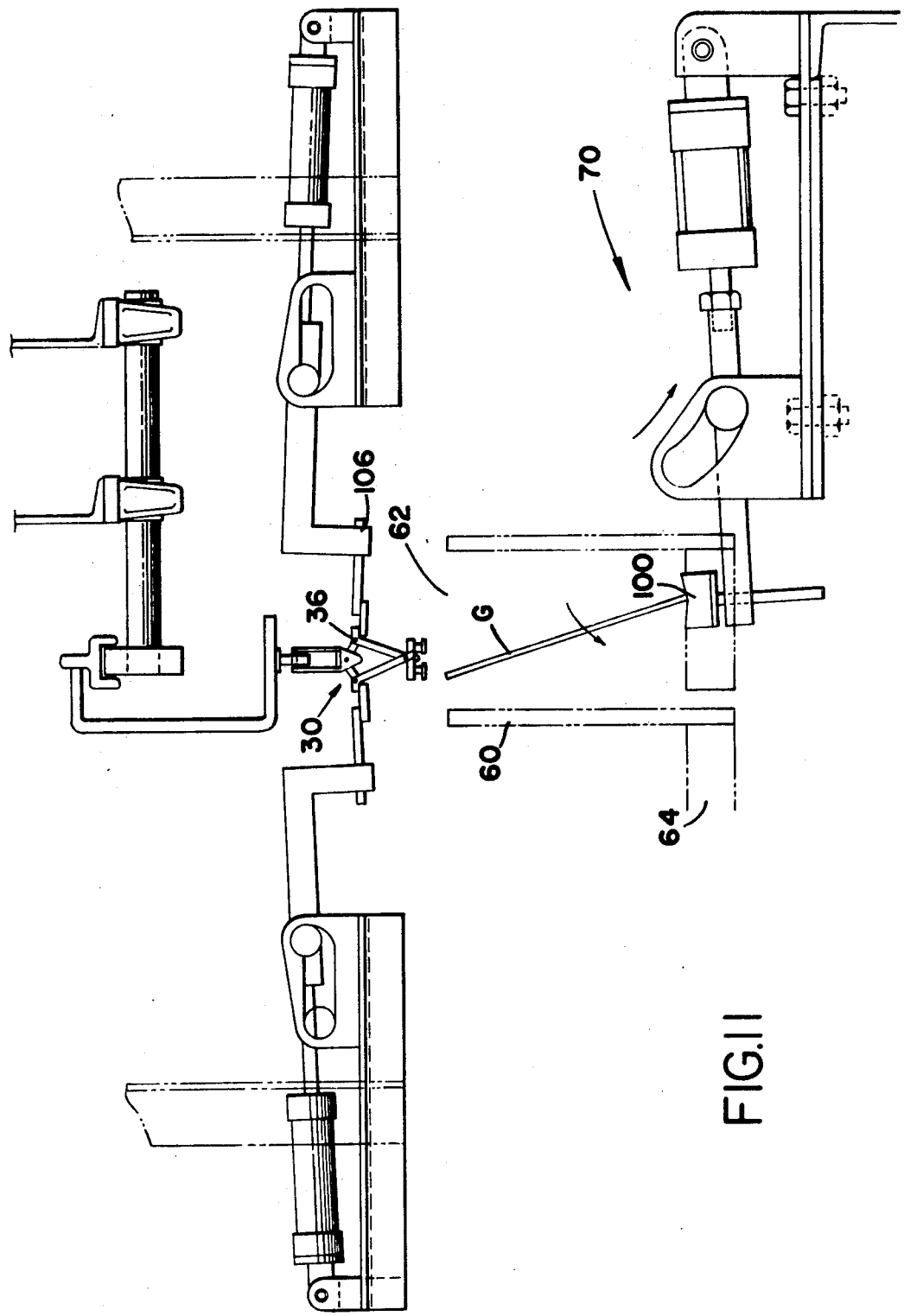

Time delay relay TD1 which is set to include the time period set for TD4 plus the time taken to actually lift the glass, now times "out" thus deenergizing solenoid No. 6 with the latter in turn acting through its associated pneumatic valve to effect retraction of the ram 90 of cylinder 78 whereby the pads 100 together with the glass sheet G are lowered downwardly into the space 62 existing between adjacent sets of pegs 60 of the peg conveyor 12. This action is illustrated in FIG. 11. When the pads 100 reach their lowermost position, the bottom edge of the glass sheet G has been deposited on one of the sets of support pads 64 previously described. These pads are indicated in dotted lines in FIG. 11. By virtue of the rearward (to the right of FIG. 11) movement of the support pads 100 during retraction of the glass lift assembly 70, the bottom edge of the sheet is moved such that the glass sheet as a whole tends to rotate in a counterclockwise direction as soon as it is freed from tongs 30 whereby the glass sheet falls forward onto the next adjacent set of pegs 60.

Figure 9:
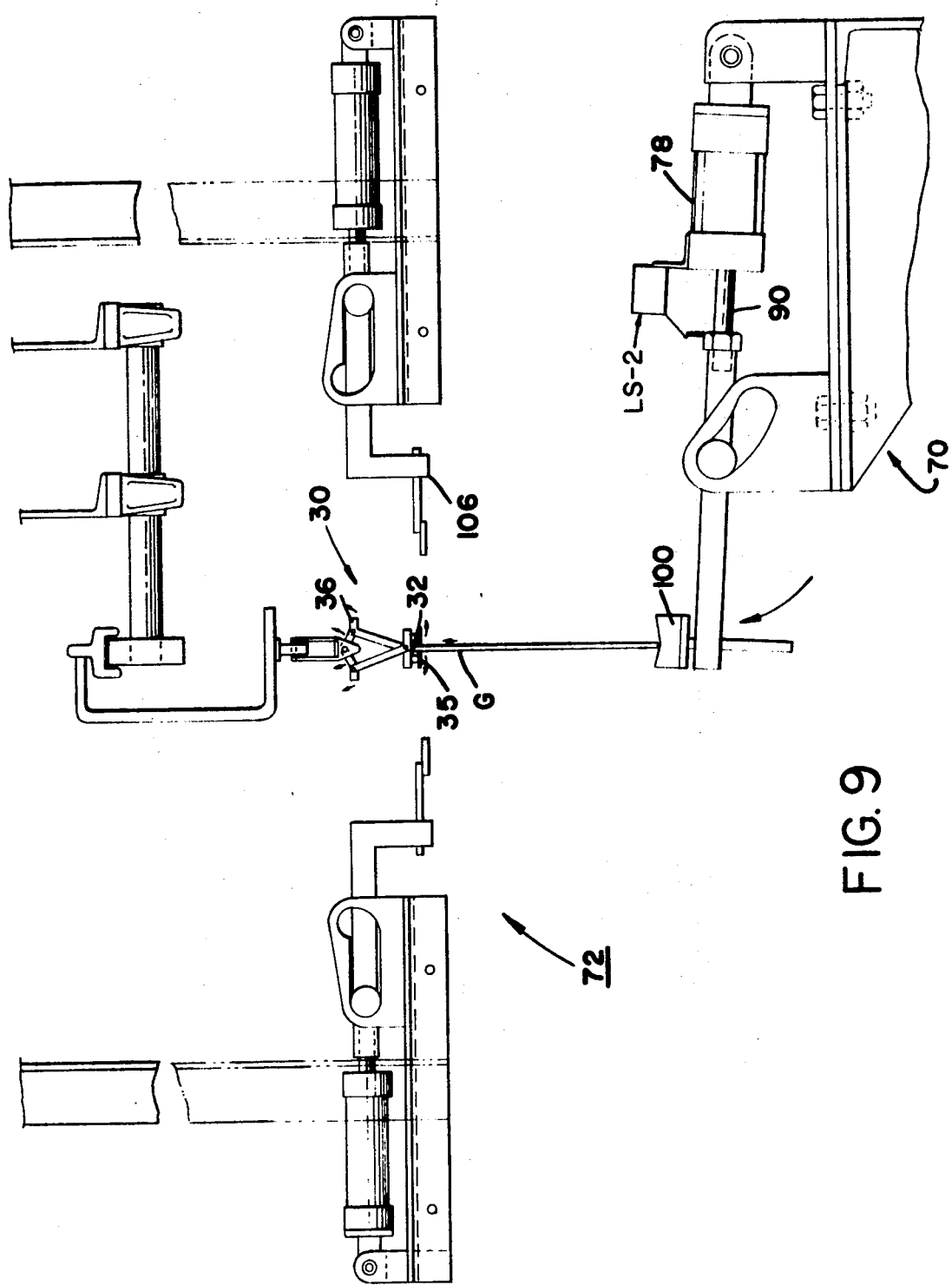
FIGS. 9, 10 and 11 are fragmentary elevational views illustrating various positions assumed by the tong engaging and sheet engaging assemblies during various phases of the transfer operation.

During the time that retraction of the glass lifter assembly 70 is taking place, the tong engaging arms 106 remain in their raised position in contact with tong arms 36 exactly as shown in FIG. 9. However, as soon as the glass lifter assembly 70 reaches its fully retracted position, switch LS-2 moves back to its normal position whereby its normally closed side loads the time delay relay TD3 thus permitting the normally closed contacts TD3 to close and energizing the starting circuit of peg conveyor drive motor M1. The function of the TD3 timer is to permit the peg conveyor drive motor M1 to operate until such time as the conveyor has been moved sufficiently as to move one of the pegs 60 thereof past switch LS-3 thereby permitting the latter to assume its normally closed condition. As soon as normally closed switch LS-3 assumes its closed condition, timer TD3 times "out" causing contacts TD3 to "open." The motor M1 continues to receive power via normally closed switch LS-3 thereby to move the peg conveyor 12 one full station i.e. until a new space 62 has been provided to accommodate a new glass sheet G after which switch LS-3 is opened by virtue of a further peg 60 coming into contact with the actuating lever of LS-3, thus opening the latter and cutting off the power to motor M1. As soon as this happens the peg conveyor 12 stops.

The conveyor 10 then transfers a new sheet of glass G to the transfer station again thus actuating limit switch LS-1 whereupon the above-described cycle is repeated over again.

SOME MODIFICATIONS AND VARIATIONS

Figure 12:
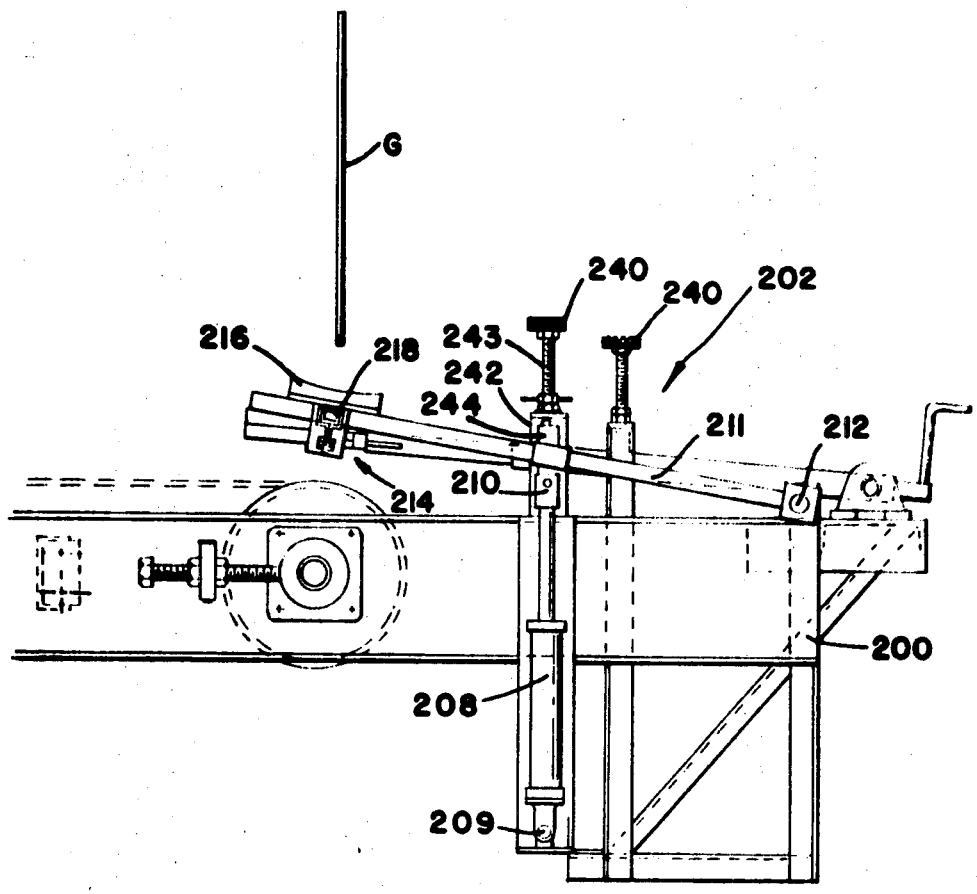
FIGS. 12 and 13 are fragmentary elevation and plan views respectively, of a modified form of sheet engaging and lifting device embodying the principles of the present invention.
Figure 13:
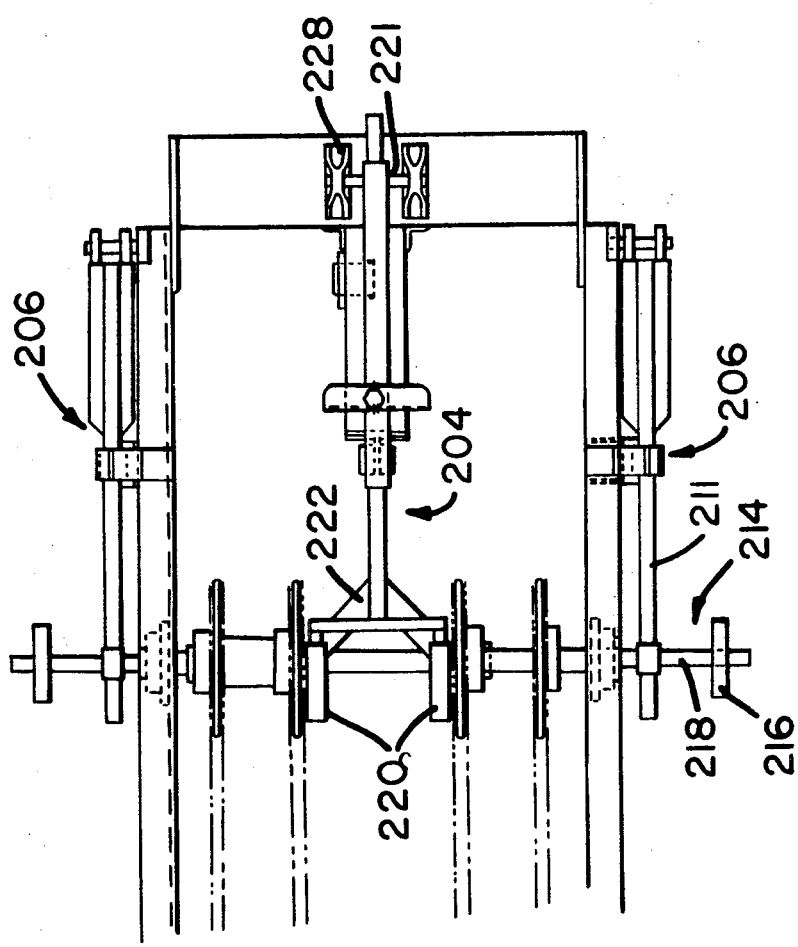

A modified glass bottom edge lifting assembly is shown in FIGS. 12 to 14. This modified arrangement is to be used in conjunction with the same overhead conveyor, peg conveyor and tong engaging and lifting assembly as was described previously in connection with the drawings FIGS. 1–11.

FIGS. 12 and 13 illustrate an end portion 200 of a peg conveyor which is located generally beneath a glass transfer station. Mounted upon the end portion of the peg conveyor 200 is a modified glass lifter assembly designated as 202. The modified lifter assembly includes a center lifting assembly 204 and a further pair of lifting assemblies 206 which flank the center lift assembly 204. The lift assemblies 206 are mirror images of one another and include a lifting cylinder 208 which is pivotally connected at one end at 209 to the end portion of the peg conveyor 200 while the rams of such cylinders 208 are pivotally connected at 210 to the midportion of swing arms 211. The swing arms 211 are pivoted at 212 to the peg conveyor while the free outer end of swing arm 211 is provided with a bottom edge support pad assembly 214. The assembly 214 comprises a glass bottom edge contact pad 216 which is mounted for lateral adjustment on a support bar 218, the latter being secured by suitable bracket means to the free end of swing arm 211. The two assemblies 206 together with their laterally adjustable pads 216 give added support to glass sheets of large dimensions being handled by the apparatus in question.

The center lifting device 204 is clearly shown in plan in FIG. 13 and in elevation in FIG. 14. The drawings show laterally spaced glass engaging pads 220, the latter being connected to yoke 222 with the latter in turn being connected to the free end of swing arm 224. The swing arm 224 is pivotally connected at 221 adjacent the extreme outer end of the peg conveyor 200 on trunnion means 228. Pivotally connected at 230 to the midportion of swing arm 224 is the ram 232 of actuating cylinder 234. The latter is pivotally connected at its opposite end at 236 to a fixed portion of the peg conveyor 200.

The center lift assembly 204 and the laterally positioned lift assemblies 206 are adapted to be actuated simultaneously by means of a control system exactly as described previously with reference to FIG. 8 and, hence, no further description of such control system need be given here. It is to be noted that the lift assemblies 204 and 206 are each provided with adjustable stops 240 which serve to limit the upward travel of each lift assembly. Each adjustable stop 240 comprises an upwardly extending member 242 having a threaded member secured therein designated as 243. Affixed to the lower end of the threaded adjustment member 243 is a stop pad 244. By rotating the adjustment member 243 the stop pad 244 is shifted upwardly or downwardly thus limiting the upward travel of the lifter assembly associated therewith.

Those skilled in the art will realize that other devices suitable for transferring a rigid sheet from tong suspension to a peg conveyor in a relatively gentle manner by engaging the tong suspended rigid sheet at its bottom edge thereby to lift the same and relax the tongs and then engaging the relaxed tongs and keeping the same relaxed while the bottom edge support members lower the sheet towards the peg conveyor could be provided. For example, the tong engaging and holding assembly may be modified to engage the tong points 35 rather than the horizontal arms 36 when disc-shaped glass engaging members of the type described and claimed in U.S. Pat. No. 3,089,727 to Hay are used as the tong points without departing from the spirit of the present invention. Accordingly, the scope of the present invention is not to be ascertained from the specific embodiments disclosed herein but only by way of the appended claims.

We claim:
1. A method of transferring a rigid sheet of material suspended from tongs which engage an upper edge portion of the sheet to a further support means comprising the steps of applying a lifting force to a lower edge portion of the sheet to lift the latter and effect a relaxation of said tongs and disengagement of the latter from the sheet, thereafter engaging said tongs to maintain the same in the relaxed condition, and lowering said sheet downwardly onto said further support while maintaining the tongs in said relaxed condition thereby effecting a transfer of the sheet from tong suspension to said further support.

2. The method according to claim 1 further including the steps of conveying rigid sheets of said material while suspended from said tongs along a first conveyor to a sheet transfer station, arresting the movement of each said sheet at said transfer station, and thereafter effecting the transfer of each said sheet to a second conveyor system which defines said further support means, and advancing the sheets transferred to the second conveyor system in step-by-step fashion.

3. The method according to claim 2 wherein said lifting force is applied to said sheet only when a predetermined interval of time after said sheet has reached said transfer station has elapsed, said interval of time being sufficient as to allow pendulumlike motion of said sheet set up by movement of the latter along the first conveyor to reduce to a desired level.

4. The method according to claim 1 wherein the rigid sheet is of glass and wherein said tongs apply a gripping force to opposing sides of an upper edge portion of the glass sheet while said glass sheet is heat treated during its conveyance along said first conveyor.

UNITED STATES PATENT OFFICE
CERTIFICATE OF CORRECTION

Patent No. 3,610,393   Dated October 5, 1971

Inventor(s) Ronald E. Richardson, Gordon F. Pereman, John D. Kellar and Jan G. Borremans It is certified that error appears in the above-identified patent and that said Letters Patent are hereby corrected as shown below:

In the above identified patent, please add the following to the front page format after the "Assignee":

[32] Priority   May 14, 1968

[33]            Canada

[31]            019,960

Signed and sealed this 18th day of April 1972.

(SEAL)
Attest:

EDWARD M. FLETCHER, JR.                ROBERT GOTTSCHALK
Attesting Officer                      Commissioner of Patents